United States Patent
Kalb

(10) Patent No.: US 6,588,718 B2
(45) Date of Patent: Jul. 8, 2003

(54) BELLOWED SUCTION CUP

(75) Inventor: James R. Kalb, Saint Petersburg, MI (US)

(73) Assignee: Syron Engineering & Manufacturing, L.L.C., Saline, MI (US)

( * ) Notice: Subject to any disclaimer, the term of this patent is extended or adjusted under 35 U.S.C. 154(b) by 0 days.

(21) Appl. No.: 10/154,466

(22) Filed: May 23, 2002

(65) Prior Publication Data

US 2002/0185575 A1 Dec. 12, 2002

Related U.S. Application Data

(60) Provisional application No. 60/297,355, filed on Jun. 11, 2001.

(51) Int. Cl.[7] .............................................. A45D 42/14
(52) U.S. Cl. ...................... 248/205.5; 248/363; 414/752
(58) Field of Search ........................ 248/205.5, 205.6, 248/205.7, 206.2, 363, 362; 414/737, 752; 254/266

(56) References Cited

U.S. PATENT DOCUMENTS

| | | | | |
|---|---|---|---|---|
| 5,193,796 A | * | 3/1993 | Nagai et al. .................. | 271/90 |
| 5,904,387 A | * | 5/1999 | Nagai et al. ................ | 294/64.1 |
| 5,909,998 A | * | 6/1999 | Herbermann et al. .... | 414/752.1 |
| 6,244,814 B1 | * | 6/2001 | Herbermann et al. ......... | 294/65 |

* cited by examiner

*Primary Examiner*—Ramon O. Ramirez
(74) *Attorney, Agent, or Firm*—Carlson, Gaskey & Olds, P.C.

(57) ABSTRACT

A resilient suction cup includes a body having an outer lip and a centrally located stem. The stem includes a substantially bell shaped stop and a plurality of expandable bellows. When the suction cup is positioned on an object, a vacuum source withdraws air from a cavity formed by the body. As the air is withdrawn by the vacuum source, the plurality of bellows collapse, and the outer lip forms a tight seal against the object. As the plurality of bellows collapse, the lower surface of the stop contacts the plurality of bellows, which further pushes against an upper surface of body, preventing the suction cup from being over-compressed while the vacuum source withdraws air from the cavity.

29 Claims, 3 Drawing Sheets

BELLOWED SUCTION CUP

This application claims priority to U.S. Provisional Application serial No. 60/297,355 filed on Jun. 11, 2001.

BACKGROUND OF THE INVENTION

The present invention relates generally to a suction cup for use in an industrial setting which includes a stop on the exterior of the body of the suction cup to increase stiffness and rigidity of the suction cup.

Suction cups are commonly utilized to lift and moves objects in an industrial setting. Suction cups are usually formed of a resilient material such as plastic or rubber and includes a substantially conical body and a centrally located stem. After placing the body of the suction cup against the object to be lifted, a vacuum source expels air within a cavity formed by the body. As the air is expelled, the outer lip of the body forms a tight seal on the object, allowing the object to be lifted and moved by a robotic arm.

In a prior art suction cup, an inner core is located on the interior surface of the body under the centrally located stem. As the air is expelled from a cavity formed by the body with the vacuum source, the inner core acts as a stop to prevent the suction cup from being over-compressed on the object.

A disadvantage of the suction cup of the prior art is that dimpling of the suction cup can occur while air is expelled from the cavity, reducing the stability of the suction cup and the strength of the seal on the object. Another disadvantage of the prior art suction cup is that the flat exterior surface of the bottom fold of the suction cup can cause deformation in the fold, resulting in a weaker seal.

SUMMARY OF THE INVENTION

A suction cup is employed in an industrial assembly to lift and move an object. The suction cup includes a body having an outer lip and a centrally located stem. The stem includes a substantially bell shaped stop on the exterior of the stem and a plurality of expandable bellows. The plurality of expandable bellows allow for rapid and easy removal of the suction cup from the object. Preferably, the suction cup is formed of a resilient material, such as rubber or plastic.

The suction cup is positioned on the object such that the outer lip of the body contacts the object. A vacuum source then withdraws air from a cavity formed by the body. As the air is withdrawn by the vacuum source, the plurality of bellows collapse, and the outer lip forms a tight seal against the object, securing the suction cup to the object.

As the plurality of bellows collapse, the lower surface of the stop contacts the upper bellow, which then pushes against the lower bellow. The lower bellow then pushes against an upper surface of the body, the body then pressing against the object. The contact of these surfaces acts as a stop, preventing the suction cup from being over-compressed while the vacuum source withdraws air from the cavity. After the suction cup is secured to the object, the robotic arm attached to the suction cup can be utilized to lift and move the object.

When the suction cup is to be removed from the object, air is allowed to flow into the cavity. The suction cup can then be detached from the object, and the resilient material of the suction cup is returned to its relaxed condition.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
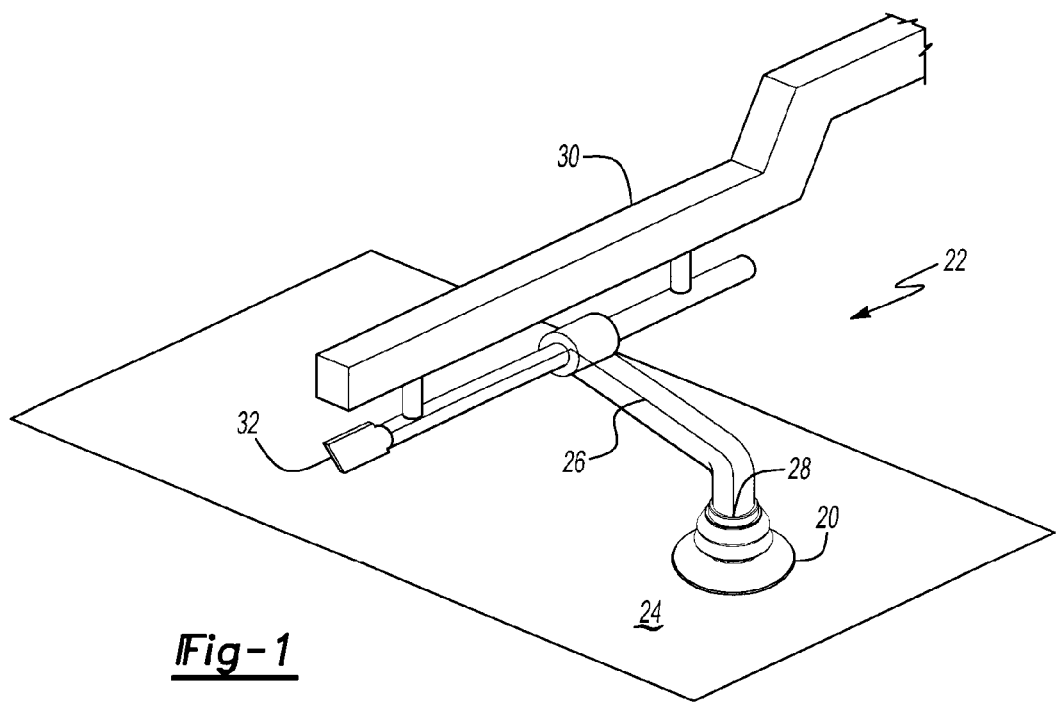
FIG. 1 illustrates the bellowed suction cup of the present invention utilized in an industrial application.

FIG. 1 illustrates a suction cup 20 employed in an industrial assembly to lift and move an object 24. As shown schematically, the suction cup 20 is mounted to a mount structure 26 by a vacuum connection 28. The suction cup 20 is positioned on an object 24 which is to be lifted by a robotic arm 30. A vacuum source 32 withdraws air inside the suction cup 20, forming a vacuum on the object 24 which allows the object 24 to be lifted and moved.

Figure 2:
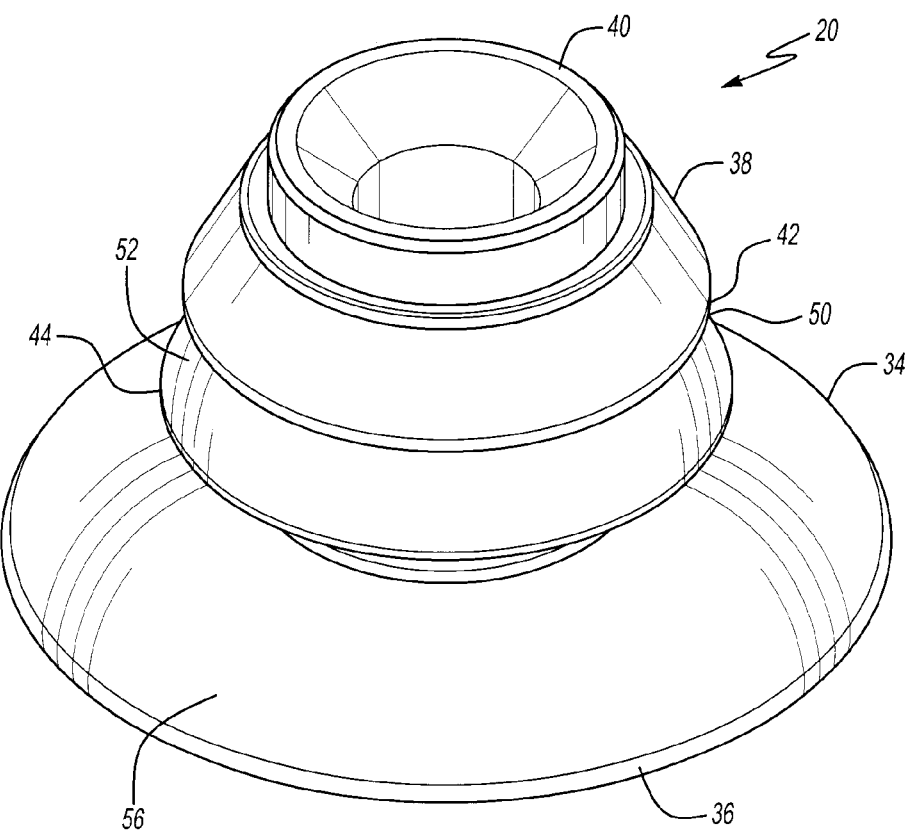
FIG. 2 illustrates a perspective view of the bellowed suction cup.
Figure 3:
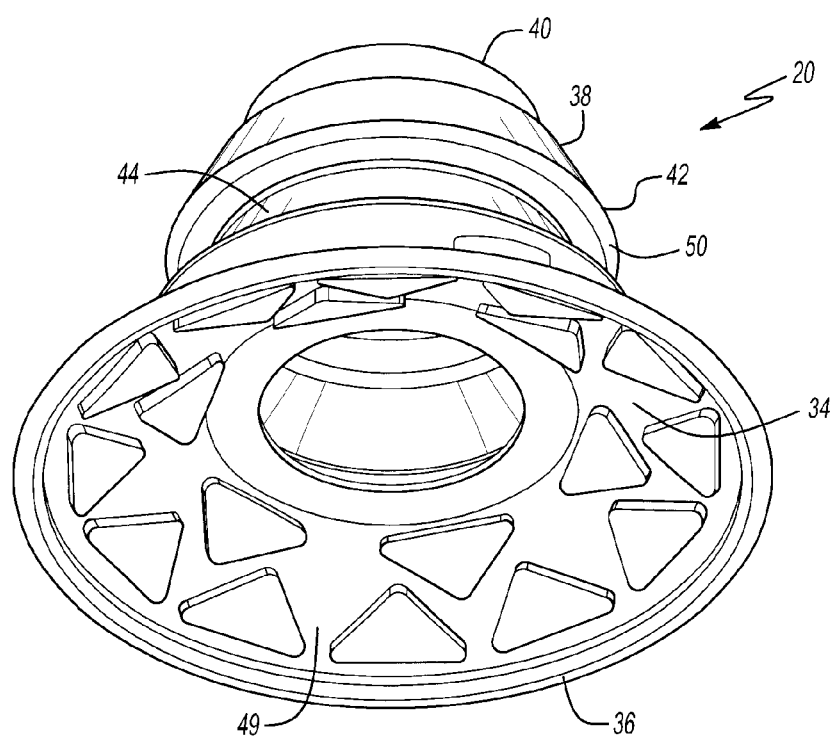
FIG. 3 illustrates a bottom view of the bellowed suction cup.

FIGS. 2 and 3 illustrate perspective views of the suction cup 20 of the present invention. The suction cup 20 includes a body 34 having an outer lip 36 and a centrally located stem 38. The stem 38 includes an upper contact surface 40, a substantially bell shaped stop 42 on the exterior of the stem 38 and a plurality of expandable bellows 44 which allow for rapid and easy removal of the suction cup 20 from the object 24. The stop 42 has an outer diameter 46 which is slightly smaller than the outer diameter 48 of the plurality of bellows 44 (shown in FIGS. 4 and 5). Preferably, the suction cup 20 is formed of a resilient material, such as rubber or plastic. The body 34 of the suction cup 20 is also preferably conical, but it is to be understood that other shapes are possible.

Figure 4:
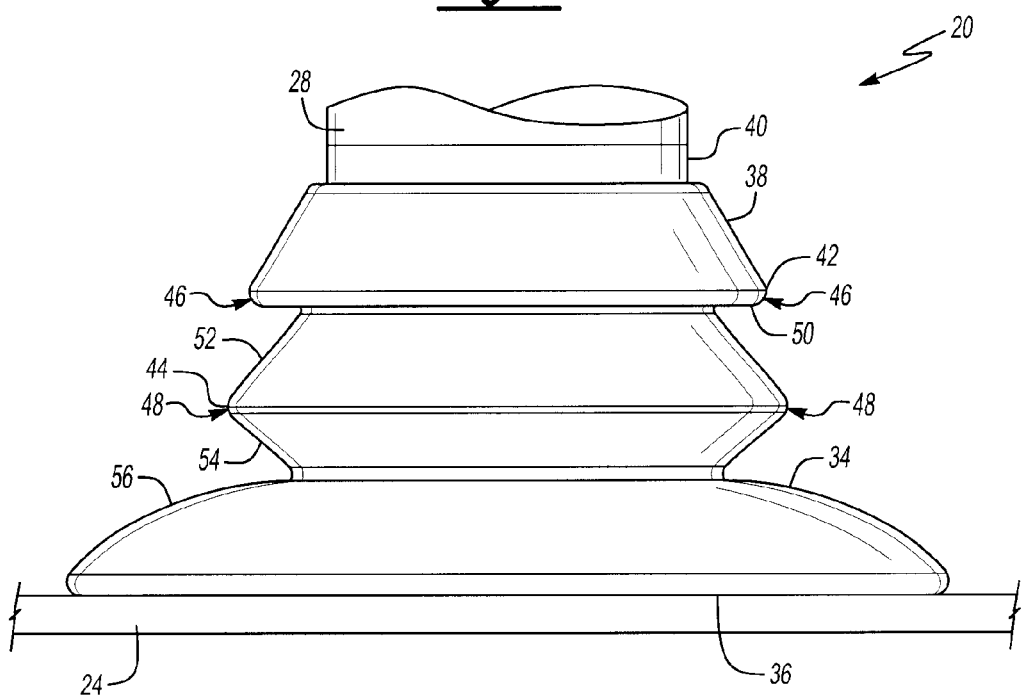
FIG. 4 illustrates a side view of the bellowed suction cup.

As shown in FIG. 4, the suction cup 20 is positioned on the object 24 such that the outer lip 36 of the body 34 contacts the object 24. A vacuum source 32 attached to the contact surface 40 of the suction cup 20 at the vacuum connection 28 withdraws air from a cavity 49 (shown in FIG. 3) formed by the body 34 and the object 26.

Figure 5:
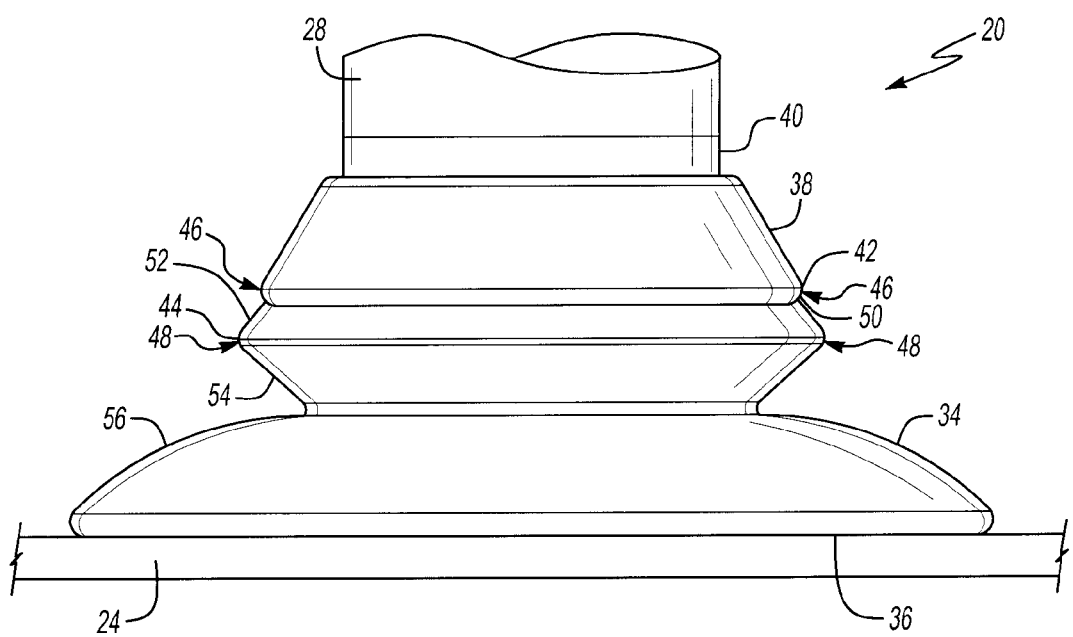
FIG. 5 illustrates a side view of a compressed bellowed suction cup.

As shown in FIG. 5, as the air in the cavity 49 is withdrawn by the vacuum source 32, the plurality of bellows 44 collapse, and the outer lip 36 forms a tight seal against the object 24. As the plurality of bellows 44 collapse, the lower surface 50 of the stop 42 contacts the upper bellow 52, which then further pushes against the lower bellow 54. The lower bellow 54 then pushes against an upper surface 56 of body 34, the body 34 then pressing against the object 24. The contact of the stop 42, the upper bellow 52, the lower bellow 54 and the upper surface 56 of the body 34 acts as a stop, preventing the suction cup 20 from being over-compressed while the vacuum source 32 withdraws air from the cavity 49.

Preferably, the body 34 is curved. The curved shape of the body 34 increases the stiffness. After the lower bellow 54 presses on the upper surface 56 of the body 34, the curved upper surface 56 of the body 34 is able to return to its original shape after the lower bellows 54 presses on it.

Although only two bellows 52 and 54 have been illustrated and described, it is to be understood that additional bellows can be employed. After the suction cup 20 is secured to the object 24, the robotic arm 30 attached to the suction cup 20 can be utilized to lift and move the object 24.

When the suction cup 20 is to be removed from the object 24, air flow is allowed to flow into the cavity 49. The suction cup 20 can then be detached from the object 24, and the resilient material of the suction cup 20 is returned to its relaxed condition.

By employing the stop 42 located on the exterior of the suction cup 20, there is an increase in stability of the suction cup 20. Dimpling and over-compression of the suction cup 20 is also prevented.

The foregoing description is exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention.

What is claimed is:

1. A suction cup comprising:
   a body; and
   a stem including an exterior protrusion and an expandable portion, and said exterior protrusion contacts said suction cup to prevent over-compression of said suction cup;
   wherein said cup has an extended position wherein said expandable portion is extended, a stopped position wherein said expandable portion is compressed and said exterior protrusion contacts said body to prevent over-compression of said suction cup, and a plurality of positions therebetween.

2. The suction cup as recited in claim 1 wherein said suction cup is rubber.

3. The suction cup as recited in claim 1 wherein said suction cup is plastic.

4. The suction cup as recited in claim 1 wherein said body is conical.

5. The suction cup as recited in claim 1 wherein said exterior protrusion is bell shaped.

6. The suction cup as recited in claim 1 wherein said expandable portion is a plurality of expandable bellows.

7. The suction cup as recited in claim 1 wherein an outer diameter of said exterior protrusion is smaller than an outer diameter of said expandable portion.

8. The suction cup as recited in claim 1 wherein said expandable portion collapses as air is withdrawn from said cavity.

9. The suction cup as recited in claim 8 wherein a lower surface of said exterior protrusion contacts an upper surface of said expandable portion and a lower surface of said expandable portion contacts said body as air is withdrawn from said cavity by a vacuum source.

10. The suction cup as recited in claim 1 wherein said body includes a curved upper surface and said exterior protrusion contacts said curved upper surface of said body to prevent over-compression of said suction cup.

11. The suction cup as recited in claim 10 wherein said curved upper surface has a body stiffness greater than a stem stiffness of said stem.

12. The suction cup as recited in claim 1 wherein said expandable portion is located between said exterior protrusion and said body.

13. The suction cup as recited in claim 1 wherein said exterior protrusion extends around an outer circumference of said stem.

14. The suction cup as recited in claim 1 wherein said body has an object contacting surface.

15. The suction cup as recited in claim 1 wherein said exterior protrusion contacts said body to prevent over-compression of said suction cup.

16. An industrial assembly comprising:
    a moveable robotic arm having an end;
    a suction cup attached to said end of said arm including a body including a cavity and a stem including an exterior protrusion and an expandable portion, and said exterior protrusion contacts said suction cup to prevent over-compression of said suction cup; and
    a vacuum source to withdrawn air from said cavity of said suction cup to secure said body of said suction cup to an object and movement of said arm lifting and moving said object;
    wherein said cup has an extended position wherein said expandable portion is extended, a stopped position wherein said expandable portion is compressed and said exterior protrusion contacts said body to prevent over-compression of said suction cup, and a plurality of positions therebetween.

17. The assembly as recited in claim 16 wherein said suction cup is rubber.

18. The assembly as recited in claim 16 wherein said suction cup is plastic.

19. The assembly as recited in claim 16 wherein said body is conical.

20. The assembly as recited in claim 16 wherein said exterior protrusion is bell shaped.

21. The assembly as recited in claim 16 wherein said expandable portion is a plurality of expandable bellows.

22. The assembly as recited in claim 16 wherein an outer diameter of said exterior protrusion is smaller than an outer diameter of said expandable portion.

23. The assembly as recited in claim 16 wherein said expandable portion collapses as said vacuum source withdraws air from said cavity.

24. The assembly as recited in claim 23 wherein a lower surface of said exterior protrusion contacts an upper surface of said expandable portion and a lower surface of said expandable portion contacts said body as said vacuum source withdraws air from said cavity.

25. The assembly as recited in claim 16 wherein said body includes a curved upper surface and said exterior protrusion contacts said curved upper surface of said body to prevent over-compression of said suction cup.

26. The assembly as recited in claim 25 wherein said curved upper surface has a body stiffness greater than a stem stiffness of said stem.

27. The assembly as recited in claim 16 wherein said expandable portion is located between said exterior protrusion and said body.

28. The assembly as recited in claim 16 wherein said exterior protrusion extends around an outer circumference of said stem.

29. The assembly us recited in claim 16 wherein said exterior protrusion contacts said body to prevent over-compression of said suction cup.

* * * * *